United States Patent
Tabata

(10) Patent No.: US 10,329,999 B2
(45) Date of Patent: Jun. 25, 2019

(54) COMPRESSOR OF EXHAUST TURBOCHARGER

(71) Applicant: TOYOTA JIDOSHA KABUSHIKI KAISHA, Aichi (JP)

(72) Inventor: Masakazu Tabata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 641 days.

(21) Appl. No.: 14/784,327

(22) PCT Filed: Apr. 16, 2013

(86) PCT No.: PCT/JP2013/061284
§ 371 (c)(1),
(2) Date: Oct. 14, 2015

(87) PCT Pub. No.: WO2014/170954
PCT Pub. Date: Oct. 23, 2014

(65) Prior Publication Data
US 2016/0069302 A1    Mar. 10, 2016

(51) Int. Cl.
| | |
|---|---|
| *F02B 33/44* | (2006.01) |
| *F02B 37/00* | (2006.01) |
| *F02M 25/07* | (2006.01) |
| *F02M 26/06* | (2016.01) |
| *F02M 26/19* | (2016.01) |
| *F02M 26/34* | (2016.01) |
| *F02B 37/12* | (2006.01) |

(52) U.S. Cl.
CPC ........... *F02B 37/00* (2013.01); *F02M 25/072* (2013.01); *F02M 26/06* (2016.02); *F02M 26/19* (2016.02); *F02M 26/34* (2016.02); *F02B 2037/125* (2013.01); *Y02T 10/144* (2013.01)

(58) Field of Classification Search
None
See application file for complete search history.

(56) References Cited

U.S. PATENT DOCUMENTS

| | | | |
|---|---|---|---|
| 6,138,651 A | 10/2000 | Mori et al. | |
| 2011/0214421 A1* | 9/2011 | Schmitt | ................... F02B 39/00 60/605.2 |
| 2013/0266436 A1 | 10/2013 | Ibaraki et al. | |

(Continued)

FOREIGN PATENT DOCUMENTS

| | | |
|---|---|---|
| EP | 2570629 A1 | 3/2013 |
| JP | H11-210564 A | 8/1999 |
| JP | 2007-154675 A | 6/2007 |

(Continued)

*Primary Examiner* — Kayla McCaffrey
(74) *Attorney, Agent, or Firm* — Hunton Andrews Kurth LLP

(57) ABSTRACT

A compressor includes an impeller, a housing, and a connecting shaft. An inlet for introducing gas into a suction side of the impeller, and an annular groove formed in an outer periphery of the inlet are formed in the housing. The groove communicates with the inlet on the intake passage side. The groove is blocked on the impeller side. A gas outlet of an EGR passage is connected with a middle of the groove. An inner diameter of the groove is machined to be larger than an inner diameter of an end part of the gas outlet of the intake passage (an end part on the inlet side).

6 Claims, 12 Drawing Sheets

(56) References Cited

U.S. PATENT DOCUMENTS

2015/0285134 A1* 10/2015 Palko ................ F02B 37/16
                                                        60/605.1

FOREIGN PATENT DOCUMENTS

| JP | 2009-108716 A | 5/2009 |
|----|---------------|--------|
| JP | 2011-032984 A | 2/2011 |
| JP | 2012-057634 A | 3/2012 |
| JP | 2012-509428 A | 4/2012 |
| JP | 2012-140876 A | 7/2012 |
| WO | 2010/059447 A2 | 5/2010 |

* cited by examiner

COMPRESSOR OF EXHAUST TURBOCHARGER

CROSS-REFERENCE TO RELATED APPLICATION

This is a national phase application based on the PCT International Patent Application No. PCT/JP2013/061284 filed Apr. 16, 2013, the entire contents of which are incorporated herein by reference.

TECHNICAL FIELD

The invention relates to a compressor of an exhaust turbocharger, and, more precisely, to a compressor of an exhaust turbocharger that is applied to an exhaust gas recirculation (EGR) system.

BACKGROUND ART

Conventionally, it has been publicly known that EGR gas is introduced to an air intake system of an internal combustion engine. For example, in Patent Document 1, introduction of EGR gas into a compressor of an exhaust turbocharger is disclosed. In this compressor, a circular EGR passage is provided in an outer peripheral area of a housing that houses an impeller. In this circular passage, two recirculation ports are formed for introducing EGR gas into the compressor. The first recirculation port is open in an air passage of an inlet of the impeller. The second recirculation port is open in an air passage on an upstream side of the inlet of the impeller.

EGR gas, which is flown from an exhaust system of an internal combustion engine into a circular passage, flows along an outer periphery of the circular passage, and is flown into a compressor through the first recirculation port or the second recirculation port depending on an amount of intake air flowing in the intake passage. Specifically, when an amount of intake air is small, EGR gas inside the circular passage is flown into the compressor through the first recirculation port. When the amount of intake air is large, EGR gas inside the circular passage is flown into the compressor through the second recirculation port. This is caused by a difference between pressure inside the circular passage and pressure in the inlet of the impeller. In the compressor having such a structure, it is possible to restrain interference between EGR gas and fresh air when the amount of intake air is small, and, when the amount of intake air is large, it is possible to introduce EGR gas directly into the inlet of the impeller.

CITATION LIST

Patent Documents

Patent Document 1: Japanese Patent Application Publication 2012-140876 A (JP 2012-140876 A)
Patent Document 2: Japanese Patent Application Publication 2011-032984 A (JP 2011-032984 A)
Patent Document 3: Japanese Patent Application Publication 2009-108716 A (JP 2009-108716 A)

SUMMARY OF THE INVENTION

Problems to be Solved by the Invention

Incidentally, EGR gas contains vapor. Therefore, when EGR gas is cooled, there are instances where condensed water is generated. In particular, when outdoor temperature is low, temperature of components of a compressor is also low, and EGR gas is thus cooled by the components, and condensed water could be generated. Condensed water generated is flown into the compressor together with EGR gas and intake air. Here, when a size of condensed water is large, an impeller could be damaged when flown into the compressor. Therefore, it is preferable to restrain generation of condensed water on an upstream side of the impeller as much as possible.

In this respect, the compressor in the Patent Document 1 has the structure in which intake air is flown into the circular passage from the first recirculation port when the amount of intake air flowing in the intake passage is large. Therefore, in the case where outdoor temperature is low and also the amount of intake air is large, it is possible that an inner wall of the circular passage is cooled by intake air flown into the circular passage from the first recirculation port. Then, because EGR gas is cooled by the inner wall of the circular passage or intake air flown into the circular passage, condensed water can be generated inside the circular passage. In addition, condensed water generated can be combined together inside the circular passage, which can cause an increase in size of condensed water.

The invention has been accomplished in view of the foregoing problems. In short, an object of the invention is to provide a compressor of an exhaust turbocharger, in which generation of condensed water due to components is restrained.

Means for Solving the Problems

In order to achieve the above-mentioned object, the first invention is a compressor of an exhaust turbocharger which includes an impeller coupled with an exhaust turbine shaft, an inlet that communicates with an intake passage of an internal combustion engine on an upstream side of the impeller, and a circular space that is formed so as to surround the inlet and communicates with the inlet and an EGR passage. One end of the circular space on the intake passage side communicates with the inlet, the circular space communicates with the EGR passage at a position closer to the impeller than a position communicated with the inlet, and the circular space is blocked at a position closer to the impeller than a position communicated with the EGR passage. An inner diameter of an end of the inlet on the intake passage side is larger than an inner diameter of an end part of the intake passage on the inlet side.

Further, the second invention is characterized in that, in the first invention, a position that a part of the circular space is blocked is located closer to the intake passage than a position that the other part of the circular space is blocked.

Furthermore, the third invention is characterized in that, in the second invention, the part of the circular space blocked is located in a downstream area of a swirl flow of EGR gas that flows in the circular space, in a radial section of the inlet including a gas outlet of the EGR passage, and the other part of the circular space blocked is located so as to be away from the intake passage towards an upstream area of the swirl flow of EGR gas that flows in the circular space.

Yet further, the fourth invention is characterized in that, in any one of the first to the third inventions, the intake passage is bent on an upstream side of the inlet, and a center axis of the circular space is located closer to an outer side of bending of the intake passage than to a rotation center axis of the shaft.

Furthermore, the fifth invention is characterized in that, in any one of the first to the fourth inventions, a gas outlet of the EGR passage is inserted into the circular space, and a center axis of the EGR passage, which passes along a center of the gas outlet, is inclined to a side of a tangent of a sectional circle of the circular space, in a radial section of the inlet including the gas outlet.

Furthermore, the sixth invention is characterized in that, in any one of the first to the fifth inventions, the gas outlet of the EGR passage is arranged so as to face a blocked end of the circular space, and, in an axial section of the inlet including the gas outlet, the center axis of the EGR passage, which passes along the center of the gas outlet, is inclined to a side of the rotation center axis of the shaft.

Effects of the Invention

According to the first invention, since it is possible to allow EGR gas, which is flown into the circular space from the EGR passage, to overflow from the part communicated with the inlet, and flow along an outer peripheral wall of the inlet, it is possible to restrain intake air from coming into contact with the outer peripheral wall. Therefore, it is possible to restrain a temperature drop of EGR gas due to the outer peripheral wall. Further, it is possible to improve a heat retention property of the outer peripheral wall by flowing the high-temperature EGR gas along the outer peripheral wall. Thus, even if condensed water is generated in the inlet, it is possible to restrain an increase in size of the condensed water as heat is transferred from the outer peripheral wall.

Further, according to the first invention, since the inner diameter of the end of the inlet on the intake passage side is larger than the inner diameter of the end part of the intake passage on the inlet side, it is possible to restrain intake air from flowing into the circular space. Therefore, it is also possible to restrain a temperature drop of EGR gas due to intake air.

EGR gas flown into the circular space from the EGR passage is reflected by the blocked end of the circular space, and overflows from the part communicated with the inlet. According to the second invention, since the part of the blocked end is formed on the side closer to the intake passage than the other blocked end, the EGR gas reflected by the part of the blocked end is overflown sooner than EGR gas reflected by the other blocked end. Therefore, even if condensed water is generated in the circular space, it is possible to discharge the condensed water to the inlet before the size of the condensed water is increased.

According to the third invention, in the radial section of the inlet including the gas outlet of the EGR passage, the part of the blocked end is formed in a downstream area of a swirl flow of EGR gas flowing in the circular space, and the other blocked end is formed so as to be away from the end of the inlet on the intake passage side towards an upstream area of the swirl flow. Therefore, a flow of EGR gas in a radial direction from the other blocked end towards the part of the blocked end is made smooth. Thus, it is possible to improve a discharge property of condensed water that is generated in the circular space.

According to the fourth invention, since the center axis of the circular space is located on the outer side of bending of the intake passage compared to the rotation center axis of the shaft, it is possible to restrain intake air from flowing into the circular space even when the intake passage is bent on an upstream side of the inlet.

According to the fifth invention, the gas outlet of the EGR passage is inserted into the circular space, and, in the radial section of the inlet including the gas outlet, the center axis of the EGR passage, which passes along the center of the gas outlet, is inclined to the side of the tangent of the sectional circle of the circular space. Therefore, it is possible to alleviate collision of EGR gas, which is flown into the circular space from the EGR passage, with the inner peripheral wall. Thus, a flow of EGR gas inside the circular space is made smooth.

According to the sixth invention, the gas outlet of the EGR passage is arranged so as to face the blocked end of the circular space, and, in the axial section of the inlet including the center of the gas outlet, the center axis of the EGR passage, which passes along the center of the gas outlet, is inclined to the side of the rotation center axis of the shaft. Therefore, it is possible to allow EGR gas, which is flown into the circular space from the EGR passage, to collide with and be reflected by the blocked end of the circular space directly. Therefore, EGR gas reflected by the blocked end is overflown in a short period of time. Thus, even if condensed water is generated in the circular space, it is possible to discharge the condensed water to the inlet before the size of the condensed water increases.

MODES FOR CARRYING OUT THE INVENTION

Figure 1:
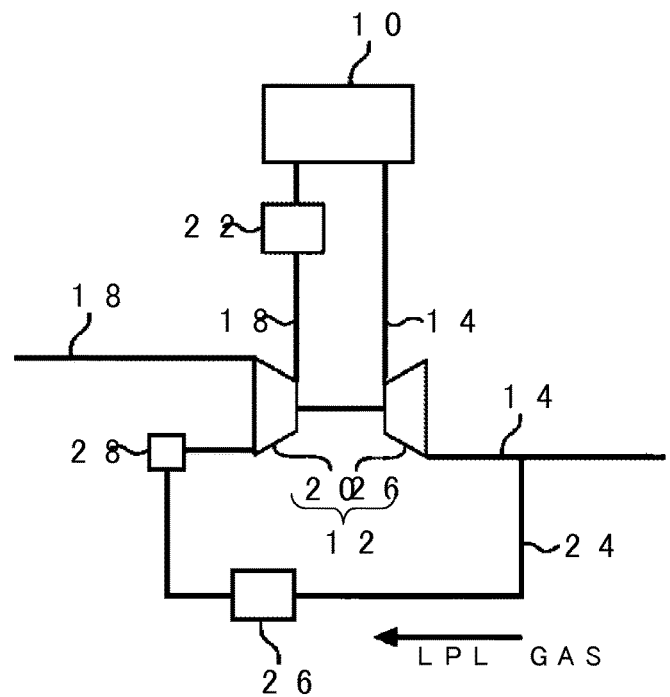
FIG. 1 is a view for explaining an entire structure of an EGR system including a compressor according to the first embodiment.

Herein below, embodiments of the invention are explained in detail with reference to the drawings. Note that the same reference numerals are used for common elements throughout the drawings so as to avoid duplicated explanation.

First Embodiment

Explanation of System Structure

First of all, the first embodiment of the invention is explained with reference to FIG. 1 to FIG. 8.

FIG. 1 is a view for explaining an entire structure of an EGR system including a compressor according to the first embodiment. As shown in FIG. 1, the EGR system is provided with an engine 10 as an internal combustion engine. Each cylinder of the engine 10 is provided with a piston, an intake valve, an exhaust valve, a fuel injector, and so on. The number of cylinders and arrangement of the cylinders of the engine 10 are not particularly limited.

The EGR system includes a supercharger 12. The supercharger 12 includes a turbine 16 provided in the exhaust passage 14, and a compressor 20 provided in an intake passage 18. The turbine 16 and the compressor 20 are coupled with each other. When the supercharger 12 is operated, the turbine 16 rotates by receiving exhaust pressure, and, the compressor 20 is thus driven, and gas flown into the compressor 20 is compressed. The intake passage 18 is also provided with an intercooler 22 that cools compressed gas.

The EGR system includes an EGR passage 24 for introducing low pressure loop (LPL) EGR gas. The EGR passage 24 connects the exhaust passage 14 on a downstream side of the turbine 16 with the compressor 20. An EGR cooler 26 for cooling EGR gas is provided in the middle of the EGR passage 24. An EGR valve 28, which controls a flow rate of EGR gas, is provided in the EGR passage 24 downstream of the EGR cooler 26. Note that low pressure loop EGR gas is referred to as "LPL gas" in the explanation below.

Characteristics of the First Embodiment

Figure 2:
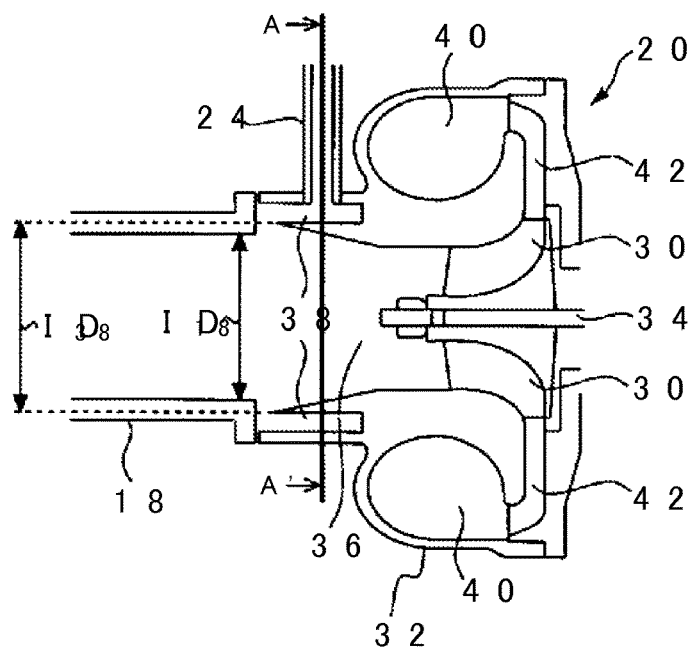
FIG. 2 is an enlarged sectional view of the vicinity of a compressor 20 in FIG. 1.

FIG. 2 is an enlarged sectional view of the vicinity of the compressor 20 in FIG. 1. As shown in FIG. 2, the compressor 20 includes an impeller 30, a housing 32, and a connecting shaft 34. The impeller 30 is connected with an impeller (not shown) of the turbine 16 through the connecting shaft 34. The housing 32 supports the connecting shaft 34 so that the connecting shaft 34 is able to rotate. In the housing 32, an inlet 36, which introduces gas to a suction side of the impeller 30, an annular groove 38 formed in an outer periphery of the inlet 36, a spiral scroll 40 formed in an outer periphery of the impeller 30, and a diffuser 42 that communicates a discharge side of the impeller 30 with the scroll 40.

Figure 3:
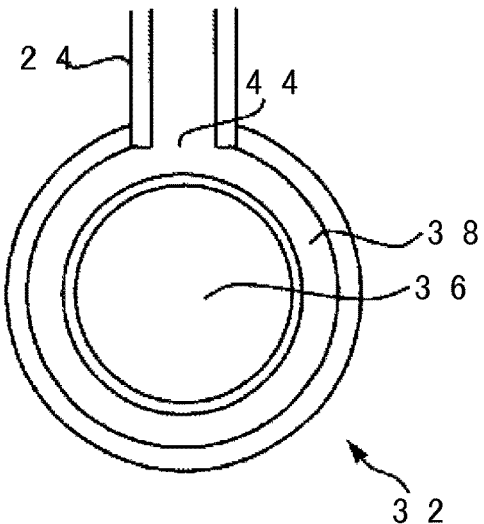
FIG. 3 is a sectional view taken along the line A-A' in FIG. 2.

As shown in FIG. 2, an inner diameter $ID_{38}$ of the groove 38 is machined so as to be larger than an inner diameter $ID_{18}$ of an end part of a gas outlet of the intake passage 18 (an end part on the inlet 36 side). Further, the groove 38 is communicated with the inlet 36 on the intake passage 18 side. The groove 38 is blocked on the impeller 30 side. A gas outlet of the EGR passage 24 is connected with the middle the groove 38. A downstream end of the EGR passage 24 including the gas outlet is arranged to be orthogonal to the groove 38. FIG. 3 is a sectional view taken along the line A-A' in FIG. 2. As shown in FIG. 3, the gas outlet 44 of the EGR passage 24 is inserted into the housing 32 and is communicated with the groove 38.

Effects of the First Embodiment

Figure 4:
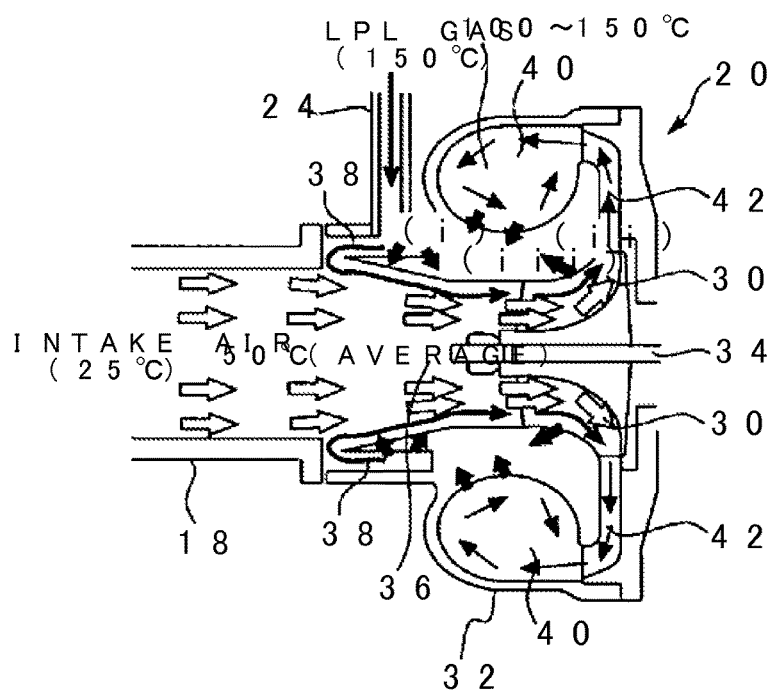
FIG. 4 is a view for explaining a flow of gas inside the compressor 20 and a heat transfer phenomenon inside a housing 32.

FIG. 4 is a view for explaining a flow of gas inside the compressor 20 and a heat transfer phenomenon inside the housing 32. As shown in FIG. 4, LPL gas flown from the EGR passage 24 into the groove 38 collides with an inner peripheral wall of the groove 38, and then is dispersed in the entire area inside the groove 38 while swirling along the inner peripheral wall. Since the groove 38 is blocked on the impeller 30 side, LPL gas inside the groove 38 overflows from the intake passage 18 side. Further, as shown in FIG. 4, intake air is flown into the compressor 20 from the intake passage 18 side. Therefore, LPL gas, which overflows from the groove 38, is sent to the impeller 30 together with intake air.

As explained in FIG. 2, in the compressor 20, the inner diameter $ID_{38}$ is machined so as to be larger than the inner diameter $ID_{18}$. Therefore, as shown in FIG. 4, intake air flown into the inlet 36 from the intake passage 18 side is sent to the impeller 30 without flowing into the groove 38. In addition, LPL gas overflowing from the groove 38 flows along the outer peripheral wall of the inlet 36. This means that, inside the housing 32, intake air flows in the center, and LPL gas flows in an outer periphery of the intake air.

According to the compressor 20 of this embodiment, since it is possible to make the above-mentioned gas flow, mixture of LPL gas and intake air is restrained. Therefore, it is possible to restrain a temperature drop caused by intake air. In particular, since it is possible to allow LPL gas to flow along the outer peripheral wall of the inlet 36, it is possible to restrain intake air from being in contact with the outer peripheral wall. Hence, it is also possible to restrain a temperature drop of LPL gas caused by the outer peripheral wall. Thus, it is possible to prevent generation of condensed water derived from LPL gas.

Because of the series of LPL gas flows, it is also possible to improve a heat retention property of the outer peripheral wall of the inlet 36. As shown in FIG. 4, as LPL gas at high temperature (at about 150° C.) flowing in the EGR passage 24 collides with the inner peripheral wall of the groove 38, temperature of the outer peripheral wall of the inlet 36 increases due to heat transferred from the LPL gas (FIG. 4 (i)). Also, as LPL gas flows along the outer peripheral wall, temperature of the outer peripheral wall also increased near the impeller 30 due to heat transferred from the LPL gas (FIG. 4 (ii)). Furthermore, temperature of the outer peripheral wall also increases due to heat transferred from LPL gas (at about 100° C.~150° C.) inside the scroll 40 (FIG. 4 (iii)). Therefore, even when condensed water is generated inside the inlet 36, an increase in size of the condensed water is restrained by heat transfer from the outer peripheral wall.

Figure 5:
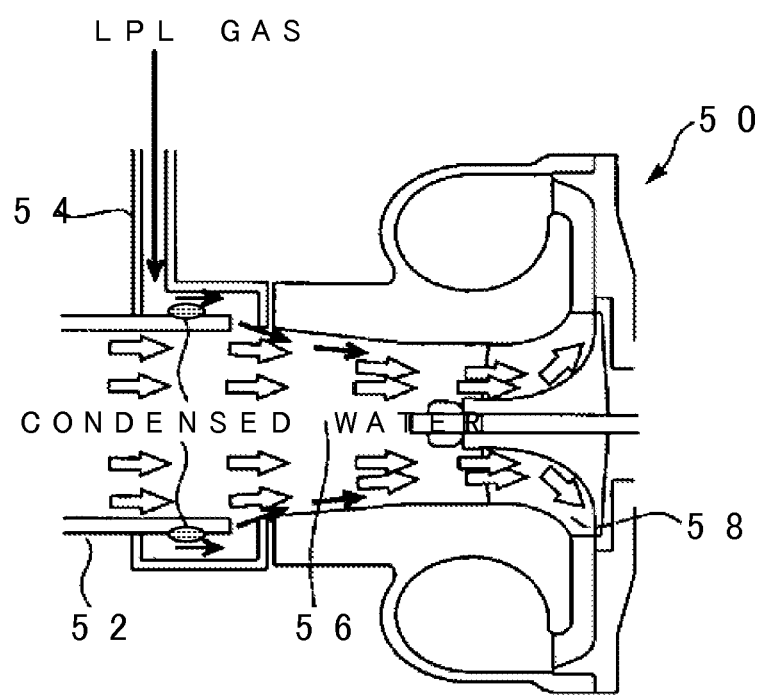
FIG. 5 is a view for explaining a flow of gas inside a conventional compressor.

FIG. 5 is a view for explaining a flow of gas inside a conventional compressor. As shown in FIG. 5, in the conventional compressor 50, an EGR passage 54 is connected with an end part of the intake passage 52 on the compressor side. Since a downstream side of the EGR passage 54 is bent into an L shape, it is possible to allow LPL gas to flow along an outer peripheral wall of an inlet 56, and allow intake air to flow on an inner side of the LPL gas. However, since there is a distance from the connection of the EGR passage 54 to an impeller 58, LPL gas and intake air are mixed together on an upstream side of the impeller 58, and temperature of LPL gas can be decreased. Also, it is possible that LPL gas is cooled at the L-shaped bent part in the intake passage 52, thereby generating condensed water.

In this respect, in the compressor 20 according to this embodiment, since the end of the gas inlet of the inlet 36 (the end on the intake passage 18 side) is closer to the impeller 30 than an end part of the gas outlet of the intake passage 18, it is possible to introduce LPL gas from a location closer to the impeller 30. Therefore, it is possible to restrain LPL gas and intake air from being mixed together on the upstream side of the impeller 30. In addition, it is possible to allow LPL gas, which overflows from the groove 38, to flow along the outer peripheral wall of the inlet 36 with an improved heat retention property. Hence, it is possible to restrain generation of condensed water derived from LPL gas. Even if condensed water is generated, it is possible to restrain an increase in the size of the condensed water.

Figure 6A:
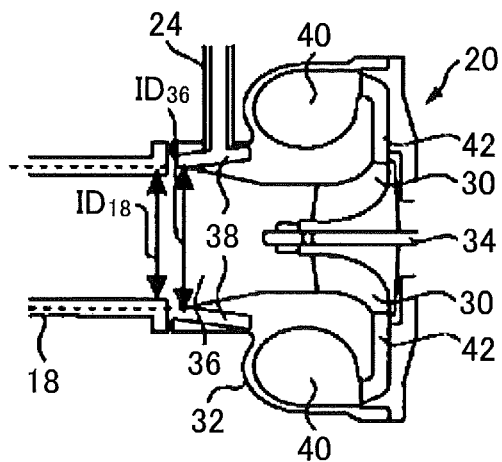
FIG. 6(a), FIG. 6(b), FIG. 6(c) and FIG. 6(d) are views showing modified examples of the compressor of the first embodiment.
Figure 6B:
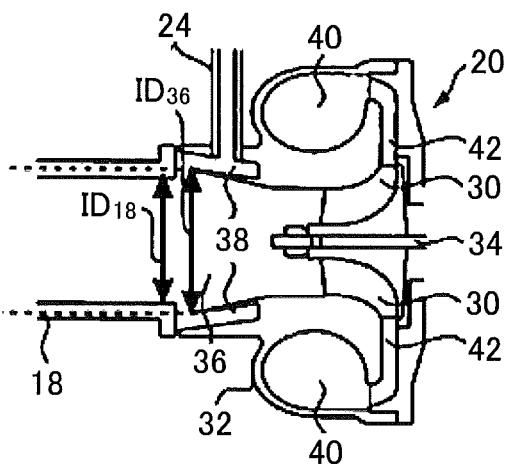
Figure 6C:
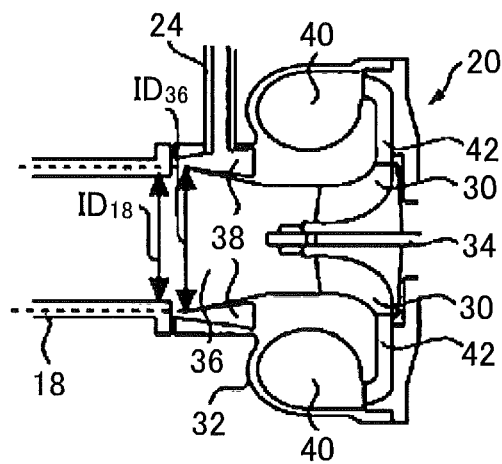

Incidentally, in the first embodiment, the shape of the groove 38 is explained using FIG. 2 as an example. However, the shape of the groove 38 may be changed in various ways. FIG. 6(a), FIG. 6(b), FIG. 6(c) and FIG. 6(d) are views showing modified examples of the compressor according to the first embodiment. As shown in FIG. 6(a), a groove diameter of the groove 38 may be machined to become larger towards the impeller 30 from the intake passage 18. Also, as shown in FIG. 6(b), the groove diameter of the groove 38 may be machined to become smaller towards the impeller 30 from the intake passage 18. Further, as shown in FIG. 6(c), a groove width of the groove 38 may be machined to become larger towards the impeller 30 from the intake passage 18. As long as the inner diameter $ID_{36}$ of the end of the gas inlet of the inlet 36 is machined to become larger than the inner diameter $ID_{18}$ of the end part of the gas outlet of the intake passage 18, it is possible to restrain intake air from flowing into the groove 38. Thus, as long as the inner diameter $ID_{36}$ is machined to be larger than the inner diameter $ID_{18}$, the shape of the groove 38 may be modified in various ways.

Figure 6D:
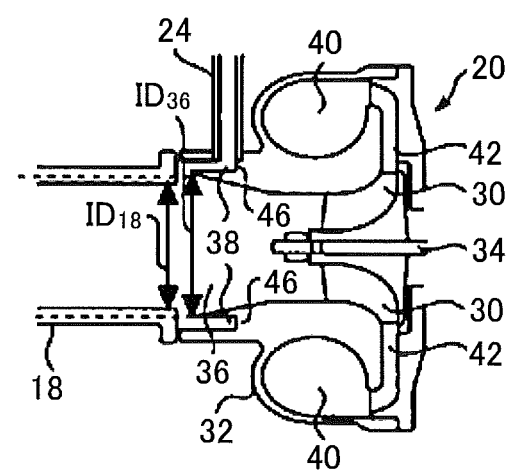

Furthermore, as shown in FIG. 6(d), a blocked end 46 of the groove 38 may be formed on the immediate downstream side of the gas outlet of the EGR passage 24. As long as the groove 38 is blocked on the side closer to the impeller 30 than the gas outlet of the EGR passage 24, it is possible to generate a flow of LPL gas explained in FIG. 4. Therefore, as long as the groove 38 is blocked on the side closer to the impeller 30 than the gas outlet of the EGR passage 24, various modifications may be made in the groove depth of the groove 38 (a distance from the end of gas inlet of the inlet 36 to the blocked end 46).

Figure 7:
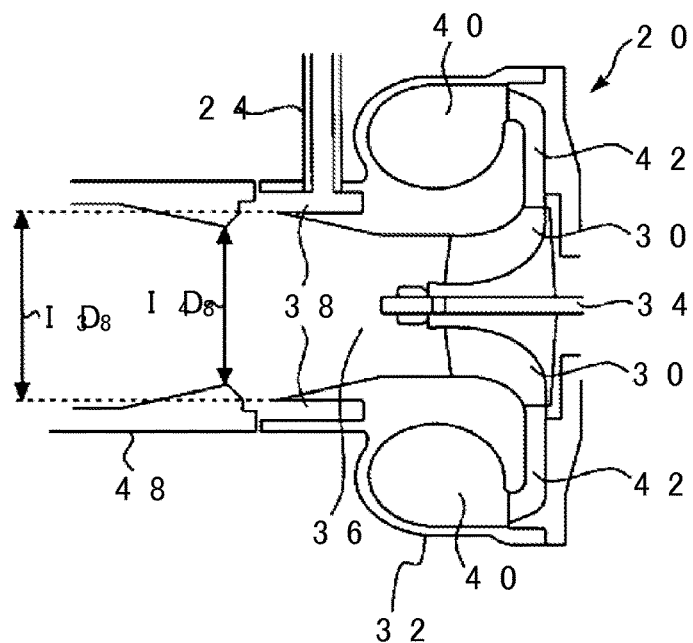
FIG. 7 is a view showing a modified example of an intake passage that can be connected with the compressor of the first embodiment.

In the foregoing first embodiment, the inner diameter of the end part of the gas outlet of the intake passage 18 is fixed, but may not necessarily be fixed. FIG. 7 is a view showing a modified example of the intake passage that can be connected with the compressor according to the first embodiment. As shown in FIG. 7, in an end part of a gas outlet of an intake passage 48, an inner diameter is reduced partially and is increased again on the compressor 20 side. With such an intake passage 48, intake air, which is flown into the inlet 36 from the intake passage 18 side, is sent to the impeller 30 without allowing the intake air to flow into the groove 38. As long as the inner diameter $ID_{36}$ of the end of the gas inlet of the inlet 36 is machined to become larger than the minimum inner diameter $ID_{48}$ in the end part of the gas outlet of the intake passage 48, various modifications may be made in the shape of the end part of the gas outlet of the intake passage 18.

Figure 8:
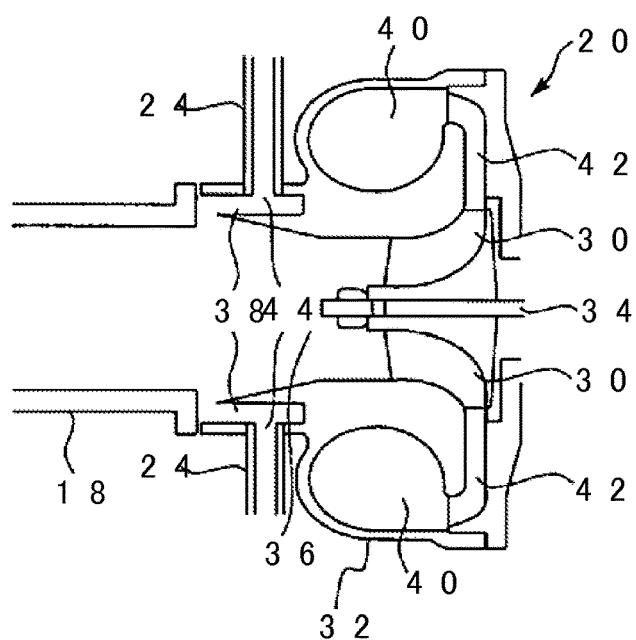
FIG. 8 is a view showing a modified example of the compressor of the first embodiment.

Further, in the first embodiment, there is one gas outlet in the EGR passage 24, but there may be a plurality of gas outlets. FIG. 8 is a view showing a modified example of the compressor according to the first embodiment. As shown in FIG. 8, two gas outlets 44 may be provided. When the groove 38 communicates with the EGR passage 24 on the side closer to the impeller 30 than a part where the groove 38 communicates with the inlet 36, and the groove 38 is also blocked on the side closer to the impeller 30 than a part where the groove 38 communicates with the EGR passage 24, it is possible to generate the flow of LPL gas explained in FIG. 4. Therefore, as long as the above-mentioned positional relation is established, various modifications may be made in the number of the gas outlets 44.

In the foregoing first embodiment, the turbine 16 corresponds to the "exhaust turbine" in the first invention stated above, the intake passage 18 corresponds to the "intake passage" in the same invention, the EGR passage 24 corresponds to the "EGR passage" of the same invention, the impeller 30 corresponds to the "impeller" of the same invention, the connecting shaft 34 corresponds to the "shaft" of the same invention, and the inlet 36 corresponds to the "inlet" of the same invention, and the groove 38 corresponds to the "circular space" of the same invention.

Second Embodiment

Next, the second embodiment of the invention is explained with reference to FIG. 9 to FIG. 11.

In a compressor according to this embodiment, similarly to the foregoing first embodiment, a groove 38 and an EGR passage are orthogonal to each other. However, in this embodiment, there is a difference from the EGR passage 24 of the first embodiment in that a gas outlet of the EGR passage is arranged in a tangential direction of a sectional circular of the groove 38. This difference is mainly explained below.

Characteristics of the Second Embodiment

Figure 9:
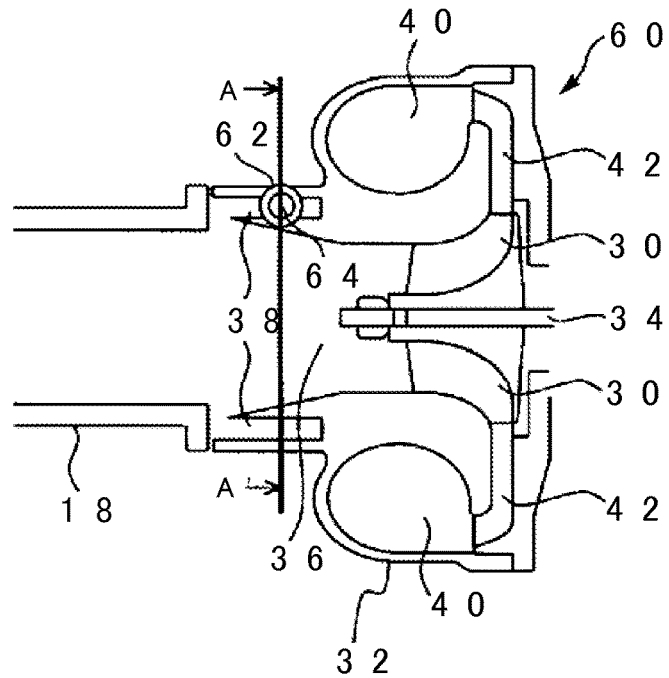
FIG. 9 is an enlarged sectional view of the vicinity of a compressor 60 of the second embodiment.
Figure 10:
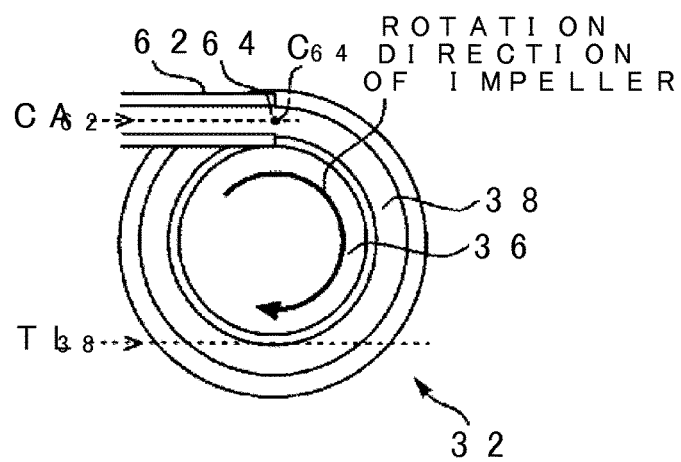
FIG. 10 is a sectional view taken along the line AA' in FIG. 9.

FIG. 9 is an enlarged sectional view of the vicinity of a compressor 60 according to the second embodiment. An EGR passage 62 is arranged to be orthogonal to the groove 38. As shown in FIG. 9, a gas outlet 64 of the EGR passage 62 is open in the groove 38. FIG. 10 is a sectional view taken along the line A-A' in FIG. 9. As shown in FIG. 10, the EGR passage 62 is inserted into a housing 32. Further, a center axis $CA_{62}$ of the EGR passage 62, which passes along the center $C_{64}$ of the gas outlet 64, is parallel to the tangent $TL_{38}$ of the sectional circle drawn by an inner peripheral wall of the groove 38.

Effects of the Second Embodiment

Figure 11:
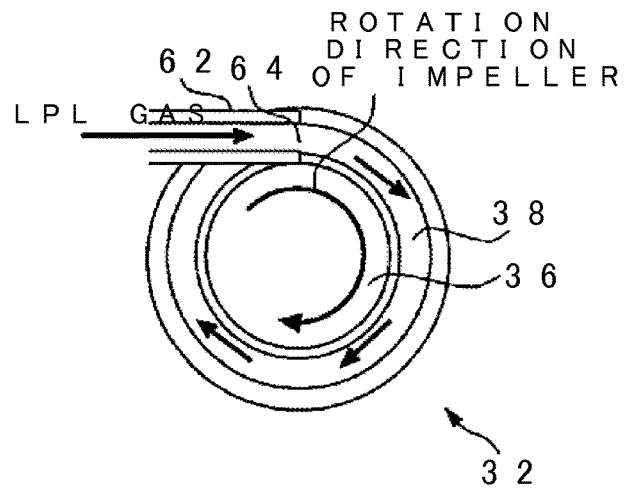
FIG. 11 is a view for explaining a flow of LPL gas inside a groove 38.

FIG. 11 is a view for explaining a flow of LPL gas inside the groove 38. In the foregoing first embodiment, LPL gas flowing into the groove 38 from the EGR passage 24 collides with the inner peripheral wall of the groove 38, and the flow of LPL gas can thus be disturbed. In this respect, as shown in FIG. 11, with the compressor 60, LPL gas, which is flown into the groove 38 from the EGR passage 62, is swirled along an inner peripheral wall of the groove 38 without colliding with the inner peripheral wall. Therefore, a flow rate of LPL gas flowing inside the groove 38 is made uniform, and it is thus possible to equally increase temperature of an outer peripheral wall of an inlet 36. Note that, in FIG. 10 and FIG. 11, a swirling direction of LPL gas is the same as, but may be opposite of, a rotation direction of an impeller.

Incidentally, in the foregoing second embodiment, the center axis $CA_{62}$ is arranged to be parallel to the tangent $TL_{38}$, but the center axis $CA_{62}$ may not be parallel to the tangent $TL_{38}$. Unless the center axis $CA_{62}$ is perpendicular to the tangent $TL_{38}$ (in other words, as long as the center axis $CA_{62}$ is inclined to the tangent $TL_{38}$ side), collision of LPL gas with the inner peripheral wall of the groove 38 is alleviated. Thus, as long as the center axis $CA_{62}$ is inclined to the tangent $TL_{38}$ side, various modifications may be made in the positional relation between the center axis $CA_{62}$ and the tangent $TL_{38}$.

In the foregoing second embodiment, a gas outlet 44 corresponds to the "gas outlet" in the fifth invention, the center axis $CA_{62}$ corresponds to the "center axis" in the same invention, and the tangent $TL_{38}$ corresponds to the "tangent" of the same invention.

Third Embodiment

Next, the third embodiment of the invention is explained with reference to FIG. 12 to FIG. 13.

In a compressor according to this embodiment, similarly to the first embodiment, an EGR passage is connected with a groove 38. However, in this embodiment, there is a difference from the EGR passage 24 of the foregoing first embodiment in that a gas outlet of the EGR passage is arranged so as to face a blocked end of the groove 38 on an impeller 30 side, and also the EGR passage is inclined to a connecting shaft 34 side. This difference is mainly explained below.

Characteristics of the Third Embodiment

Figure 12:
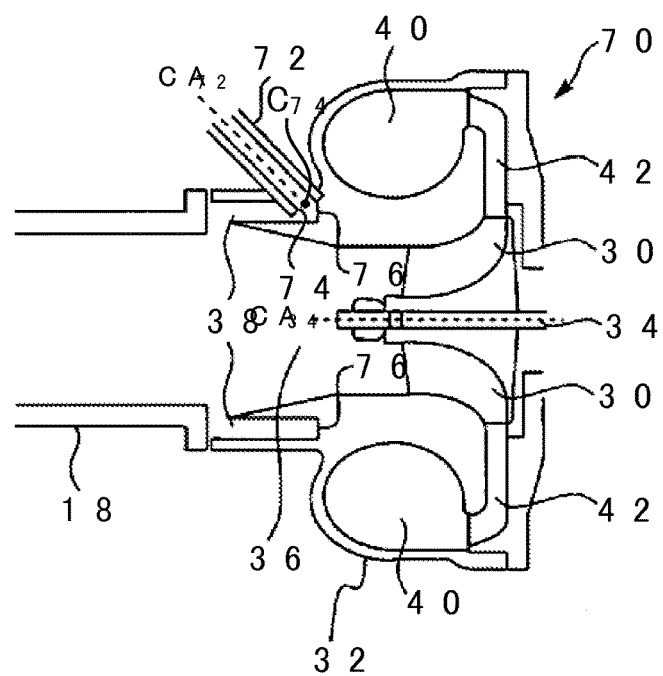
FIG. 12 is an enlarged sectional view of the vicinity of a compressor 70 of the third embodiment.

FIG. 12 is an enlarged sectional view of the vicinity of a compressor 70 according to the third embodiment. As shown in FIG. 12, a gas outlet 74 of an EGR passage 72 is arranged so as to face a blocked end 76 of the groove 38. Also, a center axis $C_{A72}$ of the EGR passage 72, which passes along a center $C_{74}$ of the gas outlet 74 is inclined with respect to a rotation center axis $CA_{34}$ of a connecting shaft 34.

Effects of the Third Embodiment

Figure 13A:
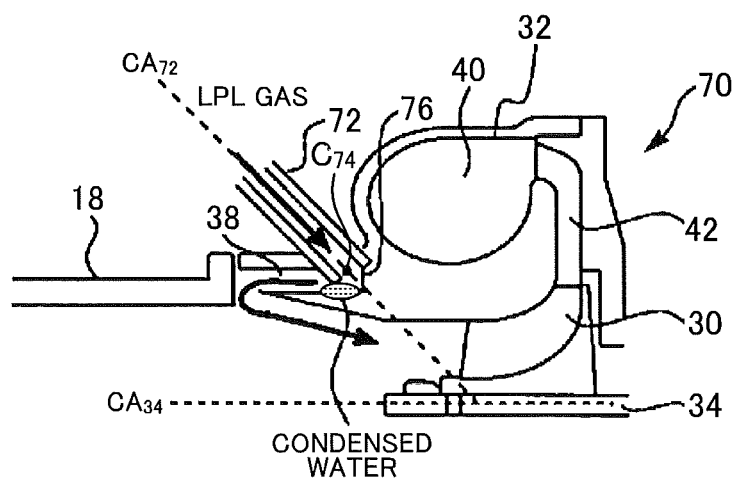
FIG. 13(a) and FIG. 13(b) is a view are views for explaining a flow of LPL gas inside the groove 38.
Figure 13B:
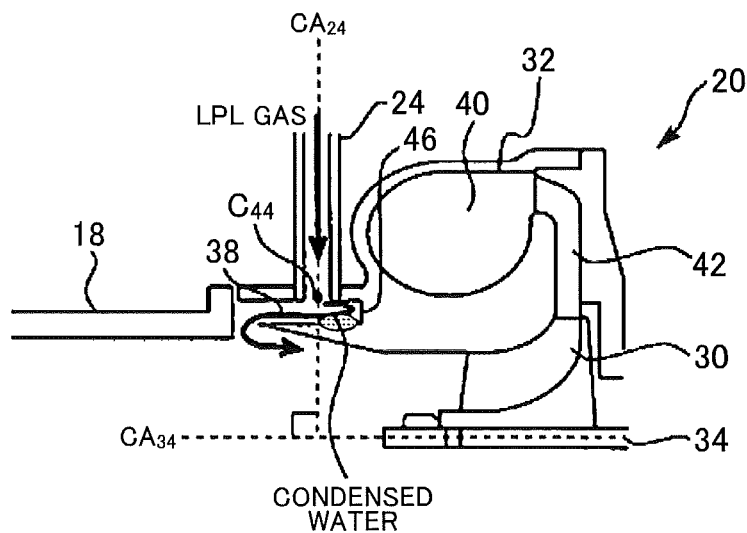

FIG. 13(a) and FIG. 13(b) are views for explaining a flow of LPL gas inside the groove 38. FIG. 13(a) corresponds to a flow of LPL gas flown into the groove 38 from the EGR passage 72, and FIG. 13(b) corresponds to a flow of LPL gas flown into the groove 38 from the EGR passage 24 according to the foregoing first embodiment. As shown in FIG. 13(a) and FIG. 13(b), EGR gas overflows from the groove 38, flows along an outer peripheral wall of the inlet 36, and is sent to the impeller 30. This was explained in the foregoing first embodiment. However, LPL gas flown into the groove 38 from the EGR passage 72 collides with and is reflected by the blocked end 76 with a great force, and overflows from the intake passage 18 side (FIG. 13(a)). On the other hand, LPL gas flown from the EGR passage 24 into the groove 38 collides with an inner peripheral wall of the groove 38 before colliding with and being reflected by the blocked end 46, and then overflows from the intake passage 18 side (FIG. 13(b)). This is because the center axis $CA_{24}$ of the EGR passage 24, which passes along the center $C_{44}$ of the gas outlet 44, makes a right angle with the rotation center axis $CA_{34}$.

According to the compressor 70 of this embodiment, it is possible to allow LPL gas, which is flown from the EGR passage 72, to directly collide with and be reflected by the blocked end 76. Therefore, it is possible to generate a strong flow of LPL gas moving inside the groove 38 towards the intake passage 18 side from the blocked end 76. Hence, even if condensed water shown in FIG. 13(a) and FIG. 13(b) is generated inside the groove 38, it is possible to discharge the condensed water outside the groove 38 along the flow.

In the foregoing third embodiment, the gas outlet 74 corresponds to the "gas outlet" of the foregoing sixth invention, the blocked end 76 corresponds to the "blocked end" of the same invention, the center axis $CA_{72}$ corresponds to the "center axis" of the same invention, and the rotation center axis $CA_{34}$ corresponds to the "rotation center axis" according to the same invention.

Fourth Embodiment

Characteristics of the Fourth Embodiment

Next, the fourth embodiment of the invention is explained with reference to FIG. 14 to FIG. 17(c).

Figure 14:
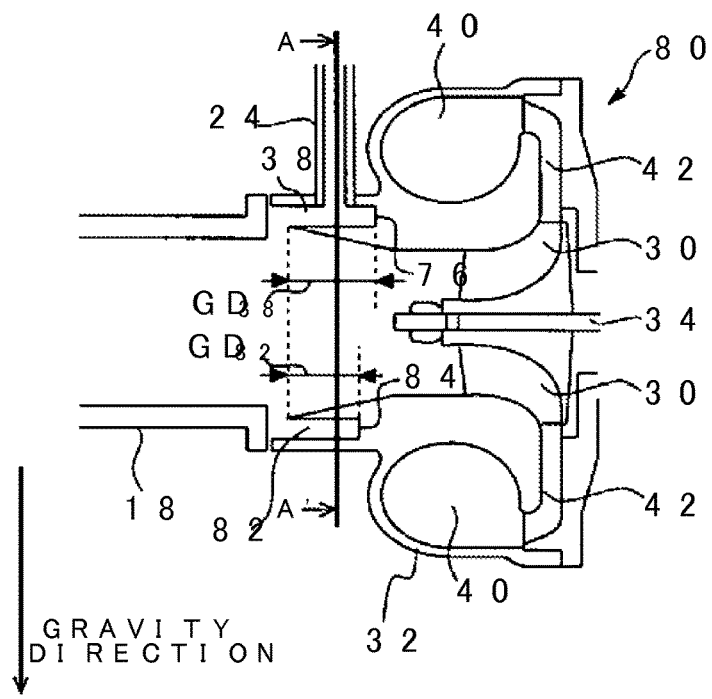
FIG. 14 is an enlarged sectional view of the vicinity of a compressor 80 of the fourth embodiment.
Figure 15:
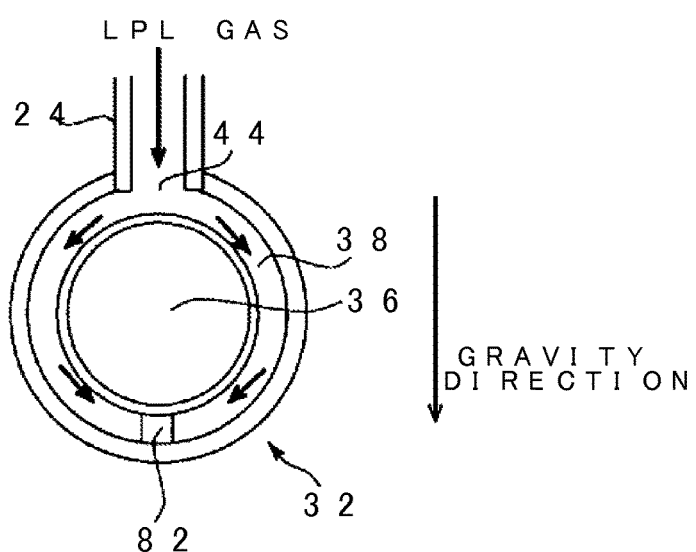
FIG. 15 is a sectional view taken along the line A-A' in FIG. 14.

FIG. 14 is an enlarged sectional view of the vicinity of a compressor 80 according to the fourth embodiment. As shown in FIG. 14, a groove depth $GD_{82}$ of a groove 82 (a distance from an end of a gas inlet of an inlet 36 to a blocked end 84) is machined to become shallower than a groove depth $GD_{38}$ of a groove 38 (a distance from an end of a gas inlet of the inlet 36 to the blocked end 76). FIG. 15 is a sectional view taken along the line A-A' in FIG. 14. As shown in FIG. 15, the groove 82 is formed on an opposite side of a gas outlet 44. Arrows in the drawing show a flow of LPL gas. In short, the groove 82 is formed in a downstream area of a swirl flow of LPL gas that is flown in from an EGR passage 24. Note that, in this embodiment, the EGR passage 24 is connected with a housing 32 from above in a gravity direction (a vertical direction). This means that the groove 82 is at a lower position in the gravity direction.

Effects of the Fourth Embodiment

Figure 16A:
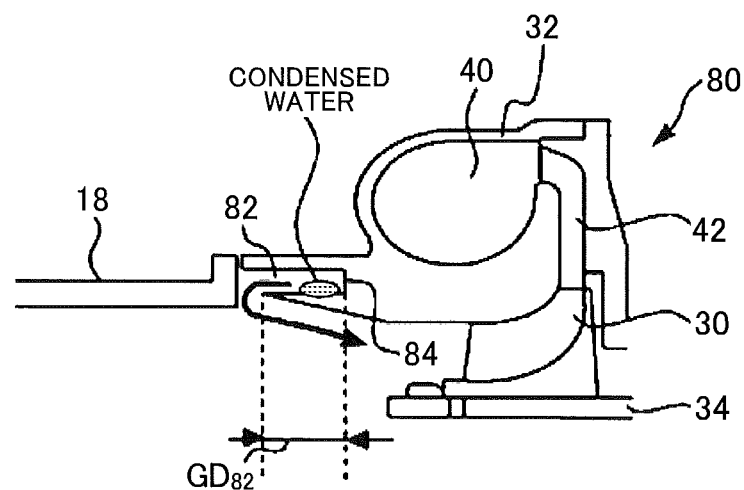
FIG. 16(a) and FIG. 16(b) are views for explaining flows of LPL gas inside the grooves 38, 82.
Figure 16B:
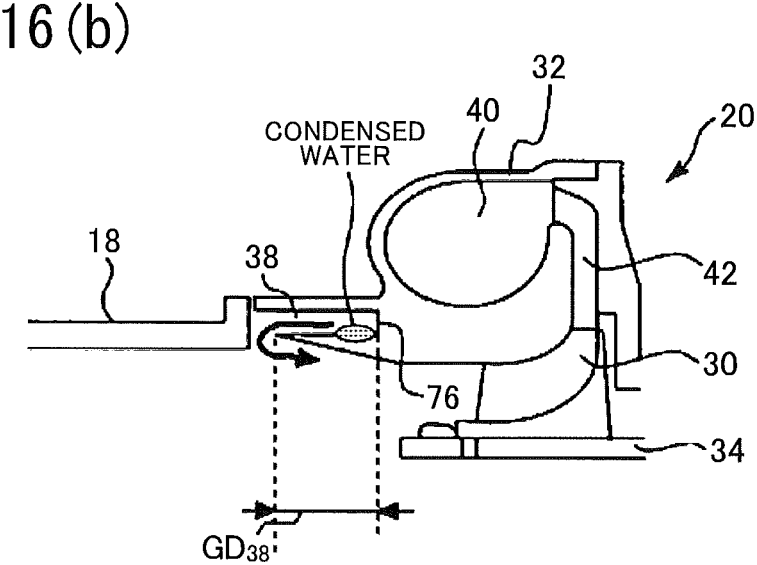

FIG. 16(a) and FIG. 16(b) are views for explaining a flow of LPL gas inside the grooves 38, 82. FIG. 16(a) corresponds to a flow of LPL gas inside the groove 82, and FIG. 16(b) corresponds to a flow of LPL gas inside the groove 38. As shown in FIG. 16(a) and FIG. 16(b), EGR gas overflows from the grooves 38, 82, flows along an outer peripheral wall of an inlet 36, and is sent to an impeller 30. This was explained in the first embodiment. However, in the compressor 80, since the groove depth $CD_{82}$ is machined to be shallower than the groove depth $GD_{38}$, LPL gas inside the groove 82 overflows sooner than LPL gas inside the groove 38. The arrows shown in FIG. 16(a) and FIG. 16(b) show moving distances of LPL gas per unit time. This means that EGR gas inside the groove 82 moves to a location closer to the impeller 30 than the EGR gas inside the groove 38.

According to the compressor 80 of this embodiment, it is possible to send LPL gas inside the groove 82 to the impeller 30 sooner than LPL gas inside the groove 38. Therefore, as shown in FIG. 16(a) and FIG. 16(b), even if condensed water is generated inside the groove 38, it is possible to send out the condensed water to the impeller 30 side from the groove 82 before the size of the condensed water increases.

In this embodiment, the groove 82 is at a lower position in the gravity direction. Therefore, it is also possible to send out condensed water from the groove 82 more smoothly.

Incidentally, in the foregoing fourth embodiment, the groove depth $GD_{38}$ is fixed. However, the groove depth $GD_{38}$ may be gradually deeper from the groove 82 towards an upstream area of a swirl flow of EGR gas (towards the gas outlet 44 from the groove 82). By machining the groove depth $GD_{38}$ like this, it is possible to send out condensed water from the groove 82 more smoothly.

Figure 17A:
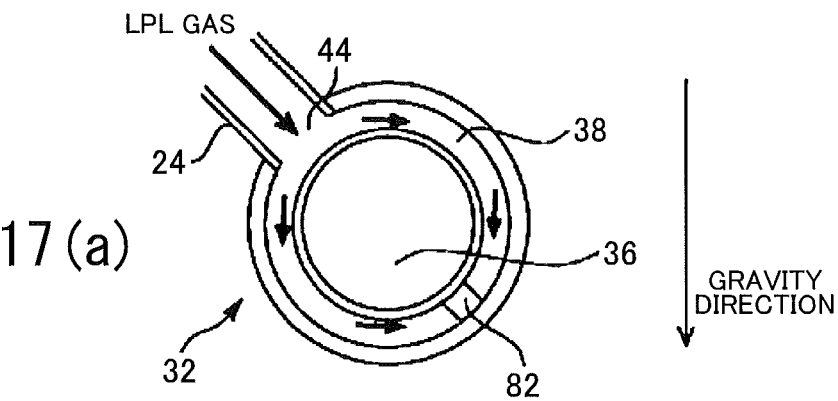
FIG. 17(a), FIG. 17(b) and FIG. 17(c) are views showing modified examples of the compressor of the fourth embodiment.
Figure 17B:
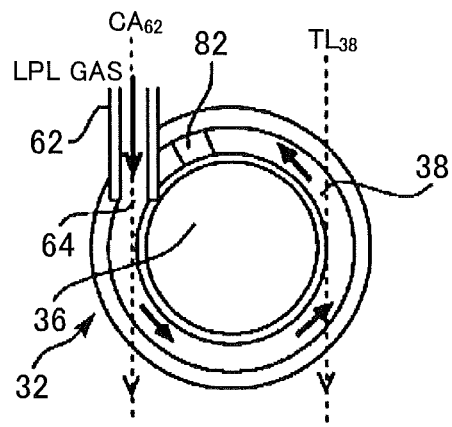
Figure 17C:
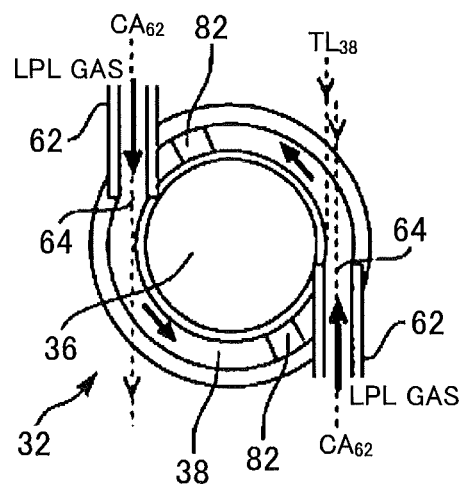

Also, in the foregoing fourth embodiment, the gas outlet 44 is provided in an upper position in the gravity direction, and the groove 82 is formed at a lower position in the gravity direction. However, locations where the gas outlet 44 is provided and the groove 82 are formed are not limited to the examples in the foregoing fourth embodiment. FIG. 17(a), FIG. 17(b) and FIG. 17(c) are views showing modified examples of the compressor according to the fourth embodiment. As shown in FIG. 17(a), the gas outlet 44 may be provided at a lower position in the gravity direction than the position of the gas outlet 44 in FIG. 15, and the groove 82 may be formed at an upper position in the gravity direction than the position of the groove 82 shown in FIG. 15.

The locations where the gas outlet 44 is arranged and the groove 82 is formed may be similarly modified in a case where the gas outlet 64 is arranged in the tangential direction of the sectional circle of the groove 38 like the foregoing second embodiment, and in a case where the number of gas outlets 64 is increased. FIG. 17(b) is a view showing an example of a location where the groove 82 is formed in the case of FIG. 10. As shown in FIG. 17(b), in the case where the center axis $CA_{62}$ and $TL_{38}$ are parallel to each other, it is possible to form the groove 82 in a downstream area of a swirl flow of EGR gas flown from the gas outlet 64. Further, FIG. 17(c) is a view showing an example of locations where the grooves 82 are formed in the case where two gas outlets 64 are arranged. As shown in FIG. 17(c), in the case where two gas outlets 64 are arranged, it is possible to form the grooves 82 in respective downstream areas of swirl flows of EGR gas flown from the gas outlets 64.

In other words, by forming the grooves 82 in downstream areas of swirl flows of EGR gas flown from the gas outlets 44, 64, it is possible to send out condensed water from the grooves 82. In addition, as long as the groove 82 is formed, it is possible to send out condensed water from the groove 82. Therefore, as long as the grove 82 is formed, various modifications may be made in this embodiment.

Note that, in the foregoing fourth embodiment, the blocked end 84 corresponds to "a part of a blocked end" according to the second invention, and the blocked end 76 corresponds to "the other blocked end" of the same invention.

Fifth Embodiment

Characteristics of the Fifth Embodiment

Next, the fifth embodiment of the invention is explained with reference to FIG. 18 to FIG. 19.

Figure 18:
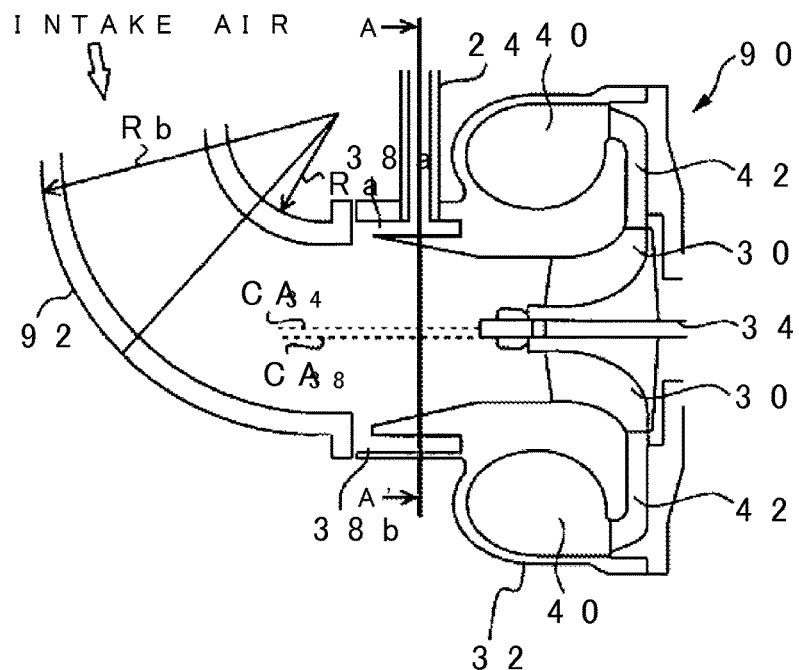
FIG. 18 is an enlarged sectional view of the vicinity of a compressor 90 of the fifth embodiment.
Figure 19:
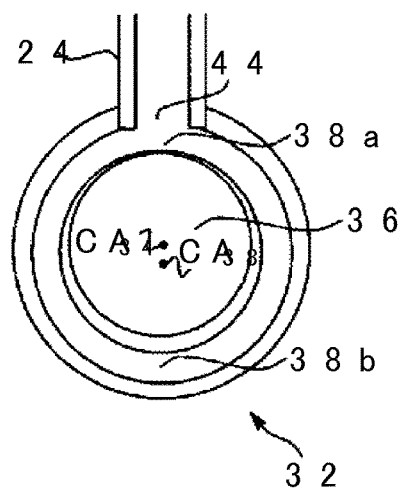
FIG. 19 is a sectional view taken along the line A-A' in FIG. 18.

FIG. 18 is an enlarged sectional view of the vicinity of a compressor 90 according to the fifth embodiment. As shown in FIG. 18, an intake passage 92 is bent to an EGR passage 24 side. Also, a rotation center axis $CA_{34}$ of a connecting shaft 34 and a center axis $CA_{38}$ of a groove 38 do not coincide with each other. To be specific, the center axis $CA_{38}$ is offset with respect to the rotation center axis $CA_{34}$ to an outer side of bending with a large curvature radius Rb (>Ra). FIG. 19 is a sectional view taken along the line A-A' in FIG. 18. As shown in FIG. 19, the center axis $CA_{38}$ is offset to the rotation center axis $CA_{34}$ in a direction away from a gas outlet 44.

Effects of the Fifth Embodiment

When the intake passage 92 is bent, centrifugal force acts on intake air. Therefore, intake air is easily flown into a groove 38b located on the outer side of the bending, compared to a groove 38a located on an inner side of the bending. In this respect, in the compressor 90, since the center axis $CA_{38}$ is offset to the outer side of the bending, it is possible to restrain an inflow of intake air into the groove 38b located on the outer side of the bending.

In the foregoing fifth embodiment, the center axis $CA_{38}$ corresponds to the "center axis" of the fourth invention stated above, and the rotation center axis $CA_{34}$ corresponds to the "rotation center axis" according to the same invention.

DESCRIPTION OF SYMBOLS

10: ENGINE
16: TURBINE
18, 52, 92: INTAKE PASSAGE
20, 50, 60, 70, 80, 90: COMPRESSOR
24, 54, 62, 72: EGR PASSAGE
30, 58: IMPELLER
32: HOUSING
34: CONNECTING SHAFT
36, 56: INLET
38, 82: GROOVE
44, 64, 74: GAS OUTLET
46, 76, 84: BLOCKED END

The invention claimed is:

1. A compressor of an exhaust turbocharger, the compressor comprising:
an impeller coupled with an exhaust turbine shaft;
a housing including an inlet communicated with an intake passage of an internal combustion engine on an upstream side of the impeller, the housing having
a circular space communicated with the inlet and an EGR passage, the circular space being located so as to surround the inlet,
one end of the circular space on the intake passage side being communicated with the inlet, the circular space being communicated with the EGR passage at a position closer to the impeller than a position communicated with the inlet, at least one part of the circular space being blocked at a position closer to the impeller than a position communicated with the EGR passage, and
an inner diameter of an end of the inlet on the intake passage side being larger than an inner diameter of an end part of the intake passage on the inlet side.

2. The compressor of the exhaust turbocharger according to claim 1, wherein a first position that a first part of the circular space is blocked is located closer to the intake passage than a second position that a second part of the circular space is blocked.

3. The compressor of the exhaust turbocharger according to claim 2, wherein the first part of the circular space blocked is located in a downstream area of a swirl flow of EGR gas that flows in the circular space, in a radial section of the inlet including a gas outlet of the EGR passage, and the second part of the circular space blocked is located so as to be away from the intake passage towards an upstream area of the swirl flow of EGR gas that flows in the circular space.

4. The compressor of the exhaust turbocharger according to claim 1, wherein the intake passage is bent on an upstream side of the inlet, and
   a center axis of the circular space is offset with respect to a rotation center axis to an outer side of a bent portion of the intake passage in a direction away from a gas outlet.

5. The compressor of the exhaust turbocharger according to claim 1, wherein a gas outlet of the EGR passage is inserted into the circular space, and
   a center axis of the EGR passage, which passes along a center of the gas outlet, is inclined to a side of a tangent of a sectional circle of the circular space, in a radial section of the inlet including the gas outlet.

6. The compressor of the exhaust turbocharger according to claim 1, wherein a gas outlet of the EGR passage is arranged so as to face a blocked end of the circular space, and
   a center axis of the EGR passage, which passes along the center of the gas outlet, is inclined to a side of a rotation center axis of the shaft, in an axial section of the inlet including the gas outlet.

\* \* \* \* \*